US006398320B1

United States Patent
Nowinski

(10) Patent No.: US 6,398,320 B1
(45) Date of Patent: Jun. 4, 2002

(54) VEHICLE BRAKING SYSTEM WITH AUXILIARY ACTIVATION CIRCUIT

(75) Inventor: John David Nowinski, Lake Orion, MI (US)

(73) Assignee: Continental Teves, Inc., Auburn Hills, MI (US)

(*) Notice: Subject to any disclaimer, the term of this patent is extended or adjusted under 35 U.S.C. 154(b) by 0 days.

(21) Appl. No.: 09/696,072

(22) Filed: Oct. 25, 2000

(51) Int. Cl.[7] ................................................. B60T 8/60
(52) U.S. Cl. ....................................................... 303/155
(58) Field of Search ............................. 303/155, 113.4, 303/3, 20, 15; 307/10.1, 10.6; 188/353

(56) References Cited

U.S. PATENT DOCUMENTS 6,193,330 B1 * 2/2001 Suga .......................... 303/155

FOREIGN PATENT DOCUMENTS

JP            6127317        * 5/1994

* cited by examiner

Primary Examiner—Christopher P. Schwartz
Assistant Examiner—C. T. Bartz

(57) ABSTRACT

A vehicle braking system including an auxiliary circuit for activating the vehicles brake system independent of the position of the vehicle ignition switch. In a preferred embodiment, the auxiliary circuit is actuated through actuation of the vehicle service brake pedal, enabling the braking system to be operable whenever the brake pedal is activated.

1 Claim, 2 Drawing Sheets

VEHICLE BRAKING SYSTEM WITH AUXILIARY ACTIVATION CIRCUIT

BACKGROUND OF THE INVENTION

1. Field of the Invention

The present invention relates to a motor vehicle brake control system and particularly to a system modification for activating the system when the vehicle is inoperative.

2. Description of the Prior Art

Safety, convenience and operating modules are typical components of a motor vehicle electrical system. The electrical system is powered by the vehicle storage battery, which is charged by the vehicle's engine driven alternator when the vehicle is operated. This battery has a finite energy capacity and therefore, current drain when the vehicle is inoperative must be limited, so as to provide cranking energy to start the vehicle's engine following prolonged periods of non-use. When the vehicle operator turns the key in the vehicle ignition switch, an electrical activation signal is sent through the electrical system to activate the vehicle electrical system enabling the safety, convenience and operating modules to be used by the operator.

To power up the vehicle electrical system using the ignition key, the operator must have the ignition key in a specific position. Occasionally, the operator may need to use vehicle functions quickly without having to have the ignition key in the switch or having it turned to a specific position to activate electrical system operating and monitoring features. Therefore, a need exists for a system enabling a vehicle electrical system to be operative without use of the ignition key. This type of feature would be especially beneficial for vehicles which feature an all electrical brake system or an electrical brake booster in which braking hydraulic pressure is boosted through an electromechanical booster unit, which does not require intake manifold vacuum as a pressure source. For such vehicles, it is desirable that the driver would not be required to have the key in a specific position or the engine running to be able to apply enough brake pressure to prevent vehicle motion. While this feature would be beneficial, cost is always a factor. Accordingly, it would be desirable to add an alternative method of activating portions of the vehicle electronics without making a significant impact on the cost of the electrical system.

Alternative methods of activating a vehicle's electronics other than with a key turned in the ignition switch have been proposed. U.S. Pat. No. 5,945,745, issued Aug. 31, 1999 describes an apparatus for controlling power to a vehicle electrical system when the ignition is off. While this apparatus would activate the electrical system with the ignition switch off, it requires several expensive components to be added to the vehicle electrical system, including a microprocessor.

U.S. Pat. No. 6,037,675, issued Mar. 14, 2000, also discusses a system for activating electrical systems in a vehicle using a method other than turning the key in the ignition switch. In this system, the operator can use a security card or can push a button on a remote unit to activate the vehicle electrical system. However, since this invention utilizes an entirely separate remote control unit, there is also significant additional cost.

From the above discussion, it is clear that the need exists for a system for activating a motor vehicle's electronics without the need to have an ignition key in a specific position or adding additional expensive components. It is therefore a primary object of this invention to fulfill that need by providing a system which allows operators to activate portions of the vehicle's electronics which does not require using the vehicle ignition key.

SUMMARY OF THE INVENTION

Briefly described, these and other objects are accomplished according to the present invention by providing an electrical circuit having a switch associated with actuation of the service brake pedal, so that when the operator applies force to the brake pedal, even when the ignition key is not in the proper position, power will be applied to the brake system to activate it, thus making its functions available.

Additional benefits and advantages of the present invention will become apparent to those skilled in the art to which the present invention relates from the subsequent description of the preferred embodiments and the appended claims, taken in conjunction with the accompanying drawings.

DETAILED DESCRIPTION OF THE PREFERRED EMBODIMENT

Figure 1:
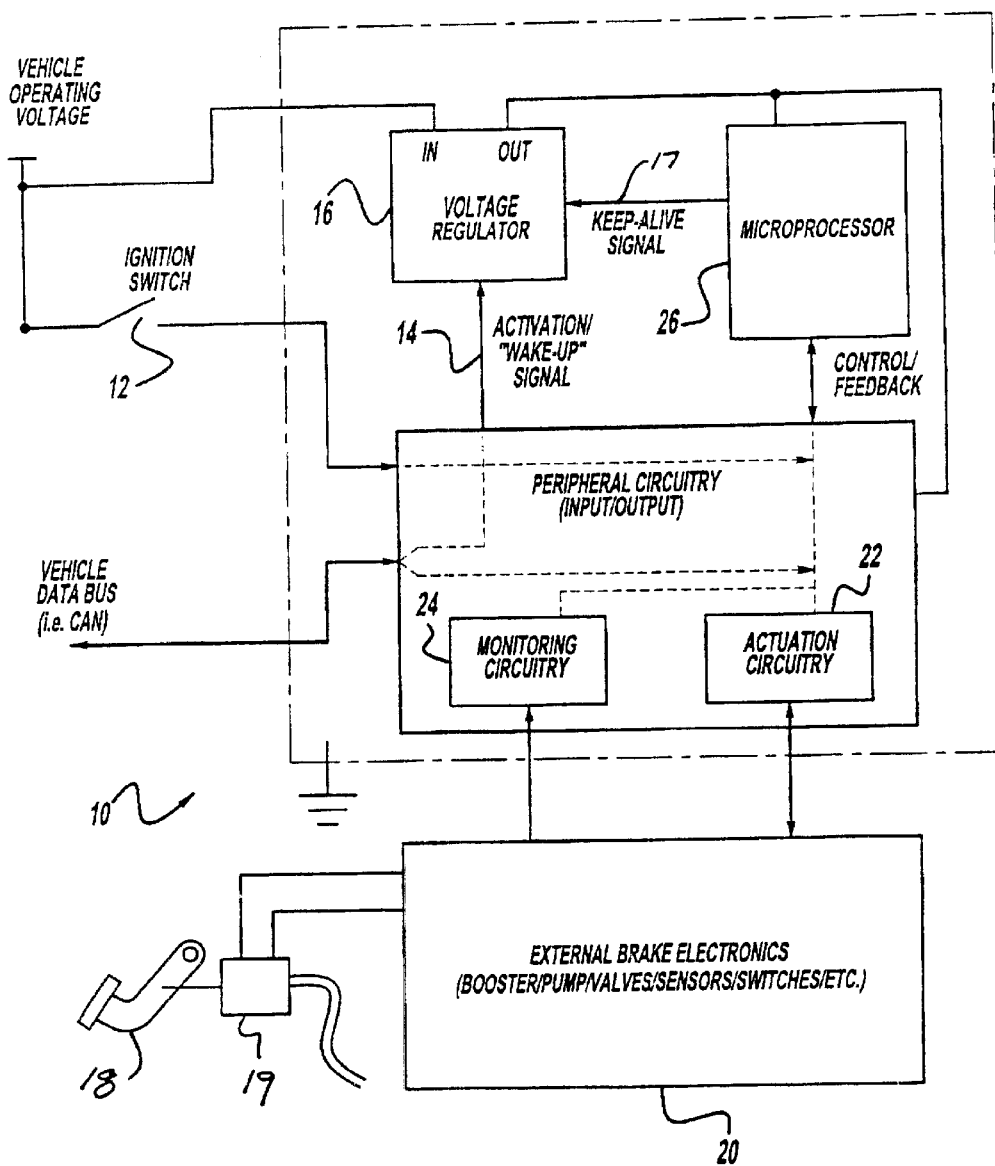
FIG. 1 is a block diagram of electrical circuit elements of a representative vehicle braking system in accordance with the prior art.

Referring now in detail to the drawings, shown in FIG. 1 is a representative electrical block diagram of a vehicle braking system 10 according to the prior art. When the ignition switch 12 is closed (the key is turned in the vehicle ignition), an activation electrical or "wake-up" signal 14 is sent to the voltage regulator 16 and microprocessor 26 which activates the external brake electronics 20 through the actuation circuitry 22 and the monitoring circuitry 24. This is a typical means of activation in a prior art vehicle electrical system. Various alternative approaches could be used. For example, instead of a low current signal being applied to voltage regulator 16, ignition switch 12 could be a high current capacity switch through which all power to vehicle braking system 10 flows. Microprocessor 26 may maintain operation of external brake electronics 20 for some set time period or when certain system steps are completed after activation signal 14 is no longer present through "keep-alive" signal 17.

External brake electronics 20 is of a type which applies hydraulic pressure or an electrical signal for applying braking torque using electrical power. Brake torque is applied through actuation of service brake pedal 18, which modulates hydraulic pressure or electrical actuation signals through electric brake booster 19.

Figure 2:
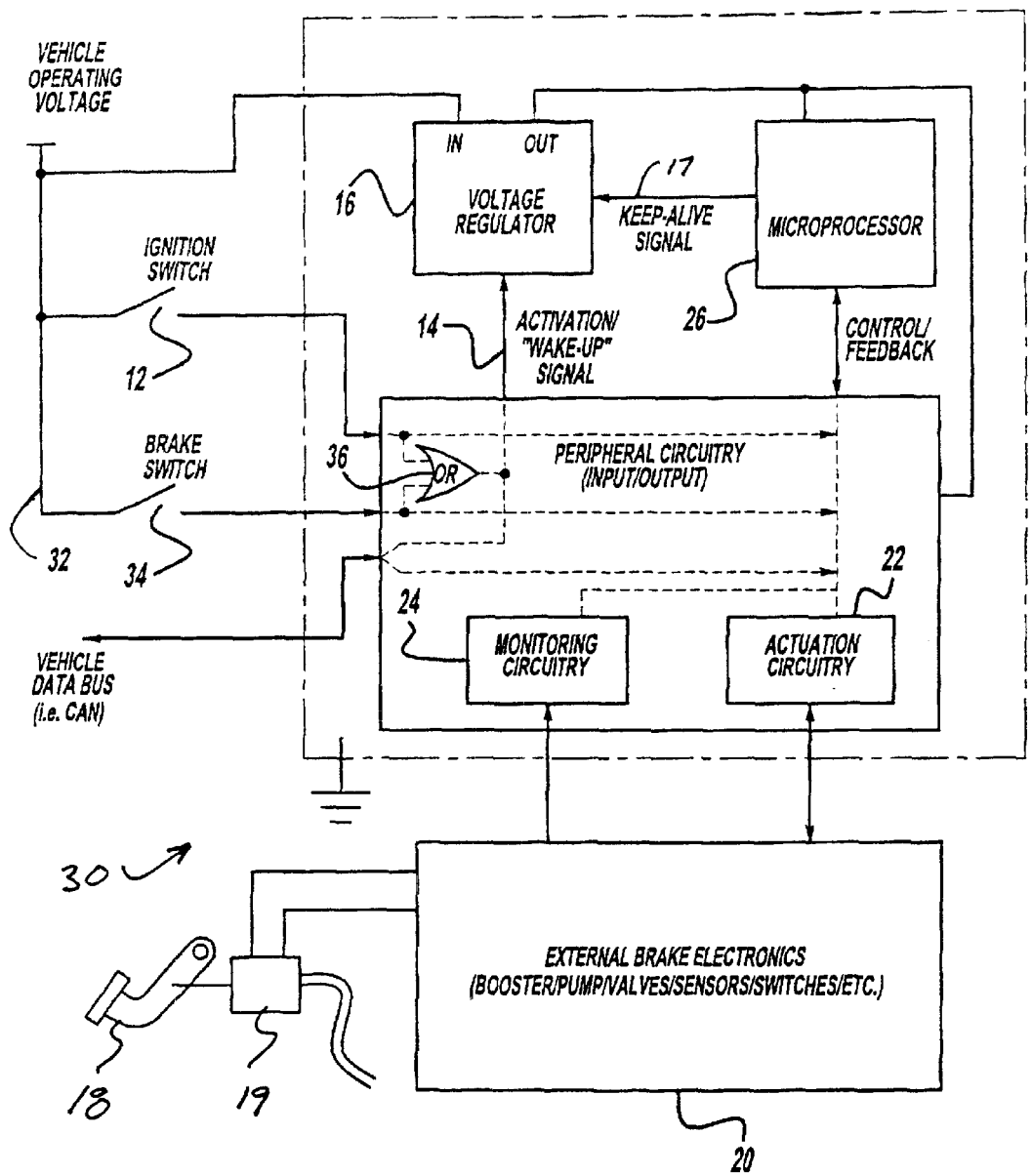
FIG. 2 is an electrical block diagram of the present invention.

A vehicle braking system in accordance with the present invention is illustrated in FIG. 2. Components of vehicle braking system 30 shown in FIG. 2 which are identical to those described with reference to FIG. 1 are identified by like reference numbers. As shown in FIG. 2, the vehicle braking system 30 differs from vehicle braking system 10 with the addition of circuit 32 which includes brake switch 34. Brake switch 34 may be the presently available brake lamp-activating switch present on conventional motor vehicles. Alternatively, brake switch 34 may be a dedicated switching device provided solely to provide for the functions of the present invention.

Brake switch 34 may also be based on various operating principles. For example, in a manner similar to existing typical brake lamp activating switches, brake switch 34 may be a plunger type, contact switch which responds to movement of the brake pedal arm. Alternatively, switches based on pressure applied to the brake pedal, or other force detecting electrical switches could be implemented. Similarly, various switching techniques based on displacement of the brake pedal such as optical devices, variable reluctance proximity pick-ups, or active electrical sensors based on Hall effect devices or other elements could similarly be used. In any event, however, brake switch 34 provides an electrical signal when the brake pedal 18 is actuated manually by an occupant of the vehicle.

As shown in FIG. 2, the electrical activation signal applied by closing brake switch 34 is applied to one input of OR gate 36. The other input of OR gate 36 is connected with vehicle ignition switch 12. Accordingly, activation electrical signals originating from the vehicle operating voltage or battery voltage can be applied to OR gate 36 through inputs generated by vehicle ignition switch 12 or brake switch 34. In either case, a logic signal is provided by the output of OR gate 36 providing actuation signal 14, which activates external vehicle braking electronics 20 in the manner explained in connection units FIG. 1. This activation signal enables the functions of the vehicle service brakes. As discussed previously, such functions may be used to stop a rolling vehicle where the vehicle engine is not operating or in other circumstances in which the ignition switch is switched to the open position. This approach would especially be useful in panic situations. For example, an operator would instinctively depress the brake pedal 18 to stop vehicle motion. When this occurs, the vehicle braking system 30 is active without any other active steps required by the operator such as turning an ignition switch or another device.

Since brake switch 34 provides an electrical activation signal only while it is physically actuated by the vehicle occupant, the vehicle braking system 30 becomes deactivated when the vehicle operator discontinues actuation of the brake pedal or the microprocessor 26 switches off the voltage regulator by deactivating the keep-alive signal 17 after some pre-set time has elapsed. Accordingly, continuous current drain from the vehicle's battery does not occur while the ignition switch is in the open position. This avoids draining the on-board electrical storage battery.

Since keep-alive signal 17 is operative to maintain brake system operation only for a limited duration after activation signal 14 is not present, system 30 is said to be normally deactivated when the activation signal is not present.

While the above description constitutes the preferred embodiments of the present invention, it will be appreciated that the invention is susceptible to modification, variation and change without departing from the proper scope and fair meaning of the accompanying claims.

What is claimed is:

1. An electrical circuit for a motor vehicle of the type having an electrically powered brake system for applying braking torque to restrain vehicle motion activated by a brake pedal, said electrical circuit comprising:

a brake circuit for applying electrical signals for applying braking torque upon actuation of said brake pedal, said brake circuit being operative upon receiving an electrical activation signal and being inoperative when said activation electrical signal is not present, said brake circuit including a logical OR gate having at least a first and a second input for receiving said activation signal such that said activation signal outputted by said OR gate is present whenever said activation signal is present from either or both said first or second inputs, an ignition switch providing said activation electrical signal to said first input of said OR gate of said brake circuit when said ignition switch is in an "on" position, and interrupting said activation electrical signal to said first input when said ignition switch is in an "off" position, and a brake switch applying said activation signal to said second input of said OR gate of said brake circuit upon actuation of said brake pedal independent of said position of said ignition switch and wherein said activation signal from said rake switch is interrupted when said brake pedal is not actuated, whereby said brake circuit is operable when said activation signal is present at either or both said first and second OR gate inputs.

\* \* \* \* \*